United States Patent
Rombach

(10) Patent No.: US 8,519,669 B2
(45) Date of Patent: Aug. 27, 2013

(54) ENERGY STORAGE UNIT PROVIDED WITH APPLICATION UNIT AND A SAFETY UNIT

(75) Inventor: Gerhard Rombach, Triberg (DE)

(73) Assignee: Continental Automotive GmbH, Hannover (DE)

( * ) Notice: Subject to any disclaimer, the term of this patent is extended or adjusted under 35 U.S.C. 154(b) by 754 days.

(21) Appl. No.: 12/682,326

(22) PCT Filed: Oct. 6, 2008

(86) PCT No.: PCT/EP2008/063324
§ 371 (c)(1),
(2), (4) Date: Apr. 9, 2010

(87) PCT Pub. No.: WO2009/050050
PCT Pub. Date: Apr. 23, 2009

(65) Prior Publication Data
US 2010/0209747 A1    Aug. 19, 2010

(30) Foreign Application Priority Data
Oct. 10, 2007   (DE) .......................... 10 2007 048 659

(51) Int. Cl.
*H01M 10/46* (2006.01)

(52) U.S. Cl.
USPC ....................................................... 320/114

(58) Field of Classification Search
USPC ................. 320/107, 112, 114, 115; 324/426, 324/427, 433
See application file for complete search history.

(56) References Cited

U.S. PATENT DOCUMENTS

| | | | |
|---|---|---|---|
| 5,164,652 A | 11/1992 | Johnson et al. | |
| 5,237,257 A | 8/1993 | Johnson et al. | |
| 6,759,849 B2 | 7/2004 | Bertness et al. | |
| 6,885,195 B2 | 4/2005 | Bertness | |
| 7,110,983 B2* | 9/2006 | Shear et al. ..................... | 705/55 |
| 2005/0017726 A1 | 1/2005 | Koran et al. | |
| 2007/0108946 A1 | 5/2007 | Yamauchi et al. | |

FOREIGN PATENT DOCUMENTS

| | | |
|---|---|---|
| DE | 690 31 090 T2 | 1/1998 |
| DE | 103 49 080 A1 | 5/2004 |
| DE | 20 2004 012 366 U1 | 10/2004 |
| DE | 20 2004 012 366 U1 | 11/2004 |
| DE | 20 2006 011 062 U1 | 9/2006 |
| EP | 1 786 057 A2 | 5/2007 |
| WO | WO 03/079032 A1 | 9/2003 |

OTHER PUBLICATIONS

Friend or foe: Battery-authentication ICs separate the good guys from the bad; by Margery Conner; EDN: Information, News, & Business Strategy for Electronics Design Engineers; Feb. 2, 2006; pp. 59, 60 and 62 (EDN.com, the Internet home of Electronic News, EDN, and Electronic Business, delivers a three-dimensional view of the electronics Industry via breaking news coverage, strategic business Information, and in-depth technical engineering content) (see introduction of the Specification).

* cited by examiner

*Primary Examiner* — Edward Tso
(74) *Attorney, Agent, or Firm* — Cozen O'Connor

(57) ABSTRACT

An energy storage unit, particularly for a motor vehicle, has an application unit that is configured to detect and/or process predetermined operating parameters of the energy storage unit. The energy storage unit further includes a safety unit that is configured to cryptologically process the detected and/or processed operating parameters. The energy storage unit also includes a communication interface for making the cryptologically processed operating parameters available.

18 Claims, 2 Drawing Sheets

ENERGY STORAGE UNIT PROVIDED WITH APPLICATION UNIT AND A SAFETY UNIT

PRIORITY CLAIM

This is a U.S. national stage of application No. PCT/EP2008/063324, filed on Oct. 6, 2008, which claims priority to the German Application No.: 10 2007 048 659.8, filed: Oct. 10, 2007, the content of which is incorporated here by reference.

BACKGROUND OF THE INVENTION

1. Field of the Invention

The invention relates to an energy store, in particular for a motor vehicle.

2. Prior Art

In modern motor vehicles, requirements for reliability and performance of an on-board electrical power supply system are particularly stringent. An energy store play an important role, in particular, in a hybrid or electric vehicle with electrical drives. Furthermore, the number of electrically powered systems in modern motor vehicles is increasing all the time. Demand for power lines in motor vehicles such as this is therefore increasing considerably. Energy management systems in modern motor vehicles attempt to suitably control the energy requirements throughout the entire motor vehicle, such that no failures of the respective energy store occur because of excessive electrical loads. The article "Friend or Foe—Battery—Authentication ICs separate the good guys from the bad" by Margery Conner, published on Feb. 2, 2006 in EDN, discloses a use of authentication chips in batteries, as well as rechargeable batteries for mobile radio telephones or laptops. These authentication chips are used to uniquely identify batteries or rechargeable batteries for the respective appliance, as a result of which only suitable batteries or rechargeable batteries can be used.

SUMMARY OF THE INVENTION

An object of one embodiment of the invention is to provide an energy store that be operated as safely and efficiently as possible.

An energy store has an application unit that is designed to record and/or to process predetermined operating parameters of the energy store, a security unit, which is designed to process the recorded and/or processed operating parameters cryptologically, and a communication interface to make the cryptologically processed operating parameters available. The charging and discharge behavior of the energy store can be determined particularly well by the recorded operating parameters, thus making it possible to ensure particularly efficient operation of the energy store. Manipulation can be identified particularly reliably by the cryptological processing of the recorded operating parameters, before they are transmitted.

According to one embodiment, the security unit is designed to encrypt the recorded and/or processed operating parameters. The operating parameters are therefore transmitted securely, thus also making it possible to prevent them from being manipulated.

According to one embodiment, the security unit is designed to produce a checksum as a function of recorded and/or processed operating parameters. The checksum is determined for this purpose as a function of the recorded operating parameters, before they are transmitted. This checksum can be transmitted in addition to the operating parameters, to reliably identify any change during transmission. This allows the integrity of the parameters to be reliably ensured.

According to one embodiment the security unit is designed to authenticate the energy store by the cryptological processing of the operating parameters. The energy store can be authenticated to the receiver of the operating parameters by suitable encryption and checksum generation. Unsuitable energy stores can thus easily and reliably be identified, thus allowing, for example, guarantee claims in the event of damage to be clearly sorted out. An energy store which is identified as being suitable can be operated particularly efficiently.

According to one embodiment the security unit is in the form of a smart card controller, and has a secure non-volatile memory for storage of data to be protected. Smart card controllers are preferably configured for encryption and checksum generation. The cryptological keys that are preferably used for encryption or checksum generation are used only within the smart card controller, thus making it possible to reliably prevent manipulation. In addition to the cryptological keys, operating parameters can also be stored in the secure non-volatile memory. Furthermore, smart card controllers are proven components, which cost particularly little.

According to one embodiment the application unit comprises an application controller with peripheral interfaces for recording and/or processing of operating parameters of the energy store. The application controller is preferably designed to be particularly powerful, in order to allow it to record the operating parameters and to process them particularly quickly. The application controller can also be used particularly suitably as a master controller to operate the security unit, in addition to recording and/or processing of the operating parameters.

According to one embodiment the security unit and the application unit are integrated on one chip. This makes it possible to ensure that the operating parameters of the energy store are recorded and processed particularly quickly and securely.

According to one embodiment the application unit comprises the communication interface. The application unit preferably comprises the peripheral interfaces, and can be therefore used particularly easily for transmission of the operating parameters.

According to one embodiment the communication interface is configured to transmit the operating parameters wirelessly. Wireless transmission is particularly suitable for making the operating parameters available to external receivers. In this case the energy store can be checked by a diagnosis apparatus.

According to one embodiment the application unit comprises a measurement unit which is designed to record operating parameters of the energy store. The operating parameters of the energy store can thus be recorded particularly easily.

BRIEF DESCRIPTION OF DRAWINGS

Exemplary embodiments of the invention will be explained in more detail in the following text with reference to the schematic drawings, in which.

Elements of the same design and/or with the same function are annotated with the same reference symbols throughout the figures.

DETAILED DESCRIPTION OF THE DRAWINGS

Figure 1:
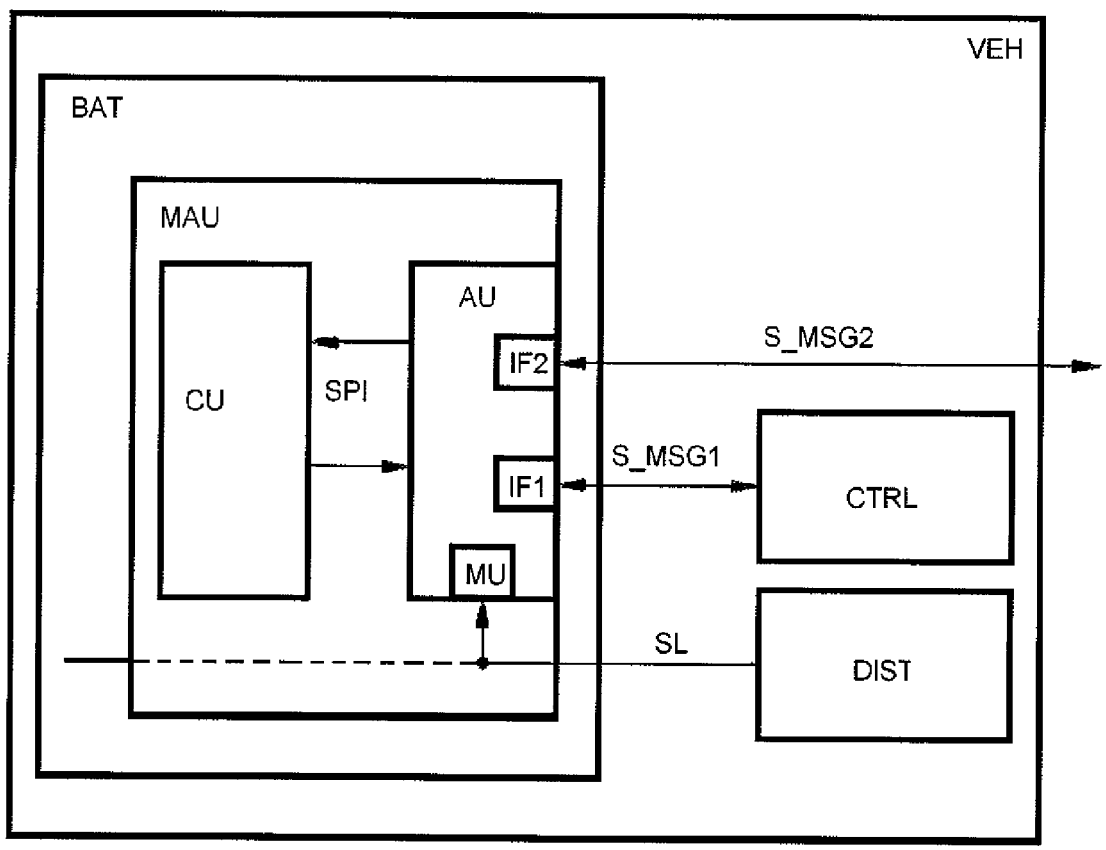
FIG. 1 is a schematic illustration of an energy store.

In FIG. 1, a motor vehicle VEH is illustrated schematically. The motor vehicle VEH has a battery BAT as an energy store for supplying the on-board power supply system. The energy store may, however, typically also be in the form of a double-layer capacitor, in particular a so-called UltraCap or Super-Cap in hybrid vehicles. However, other embodiments of energy stores that are known to a person skilled in the art are also feasible.

The energy store BAT has a measurement and authentication unit MAU whose input side has an associated supply line SL, which is typically connected to the connecting terminals of energy store BAT. The measurement and authentication unit MAU is typically also supplied via the supply line SL. The energy store BAT is connected by the supply line SL to an energy distributor DIST, and therefore to the on-board power supply system in the motor vehicle VEH. The measurement and authentication unit MAU may be integrated in a separate area in the housing of the energy store BAT, as a result of which the measurement and authentication unit MAU is connected non-detachably to the energy store BAT, and is mechanically protected. Encapsulation of the measurement and authentication unit MAU and its mounting outside the energy store are also feasible, in which case care should be taken to ensure that the mounting is preferably mechanically non-detachable.

Furthermore, the measurement and authentication unit MAU has a security unit CU and an application unit AU. The security unit CU and the application unit AU are connected to one another, such that data can be interchanged bidirectionally between the two units, for example by means of SPI. Furthermore, further signal lines can be present in order to transmit control signals between the units. The security unit CU is preferably in the form of a smart card controller, and typically has no further peripheral modules other than communication capability to the application unit. Typically, smart card controllers are designed to be suitable for cryptological processing, such as encryption and/or decryption of data streams, as well as generation and/or checking of checksums. The application unit AU has a measurement unit MU, which is required for recording the operating parameters. In addition to the measurement unit MU, the application unit AU also has a first and a second communication interface IF1 and IF2. The application unit AU is associated by the first communication interface IF1 with a controller CTRL which is in the form of an energy management system. The first communication interface IF1 is typically in the form of a CAN interface, as a result of which the operating parameters of the energy store BAT are available not only to the energy management system CTRL but also to other controllers (SMSG1). The first communication interface IF1 may also be designed to be wireless. However, other communication interfaces which are known to a person skilled in the art, for example LIN, can also be used.

The second communication unit IF2 is typically in the form of a wireless interface, for example the BLUETOOTH short range wireless communication protocol or WLAN. The operating parameters of the energy store BAT can also be made available by this interface to other apparatuses outside the motor vehicle. For example, this allows the operating parameters to be transmitted to a diagnosis apparatus in a workshop. The operating parameters transmitted by the second communication interface IF2, for example SMSG2, also be used to pay bills at a station for charging the energy store. However, in general, a cable-based second communication interface, for example, CAN, USB or RS232, is also feasible.

The operating parameters of the energy store BAT are recorded on the supply line SL by the measurement unit MU in the application unit AU, and are processed in the application unit AU. The processed operating parameters are then supplied to the security unit CU, and are cryptologically processed by this unit. In this case, a checksum can be added to the operating parameters, and/or the operating parameters can be encrypted. Operating parameters which have been encrypted and/or provided with a checksum are temporarily stored in the security unit CU, and/or are once again transmitted to the application unit AU, and are transmitted by the application unit AU to the energy management system CTRL or to the diagnosis apparatus.

By way of example, the operating parameters of the energy store are a voltage, a current, a capacity, a temperature or a type of energy store. Depending on these parameters, the voltage and current response of the energy store BAT can be determined and a charging and discharge process can thus be adapted to ensure that the energy store BAT is used efficiently.

Figure 2:
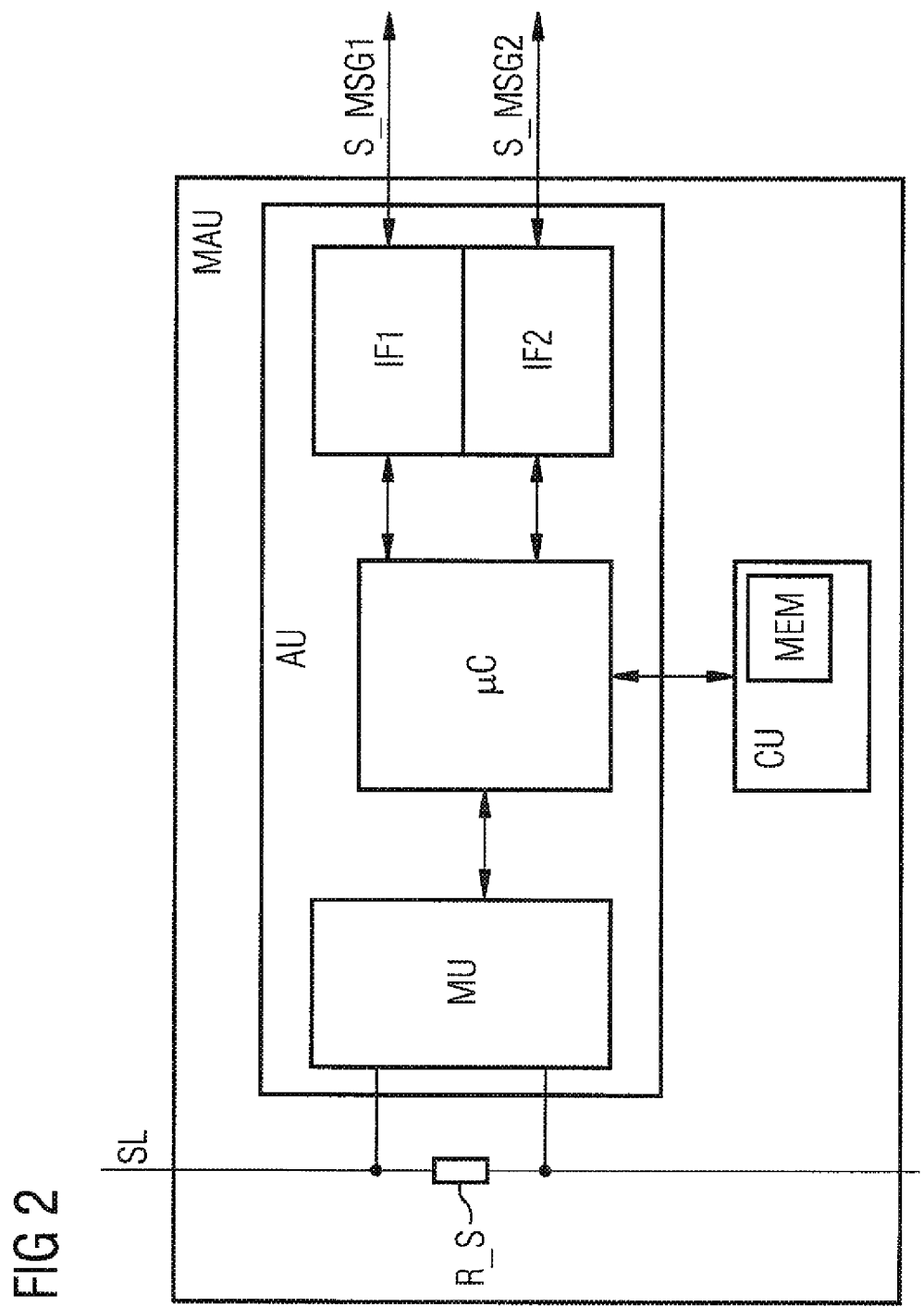
FIG. 2 is a further schematic illustration of an energy store.

FIG. 2 schematically depicts the measurement and authentication unit MAU comprising the application unit AU and the security unit CU. In addition to the first and second communication interfaces IF1 and IF2 and the measurement unit MU, the application unit AU also includes an application controller µC. This typically comprises peripheral modules for linking to the communication interfaces IF1 and IF2 and to the measurement unit MU. In this case, the application controller µC may also be designed such that it includes the measurement unit MU and/or the communication interfaces IF1 and IF2.

The security unit CU is preferably in the form of a smart card controller with a non-volatile memory MEM.

As an example of an operating parameter of the energy store BAT, the current is recorded by means of a shunt resistor R_S by the measurement unit MU which, by way of example, may be in the form of an analog/digital converter. The current through the shunt resistor R_S is determined by the application controller µC as a function of the recorded analog/digital values and is supplied to the smart card controller. The application controller µC is typically in the form of a master controller, and controls the smart card controller, which is in the form of a slave controller, such that the transmitted current value is encrypted and/or a checksum is generated as a function of it. In this case, the cryptological keys which are required for encryption and/or checksum formation are stored in the non-volatile memory MEM of the smart card controller. The smart card controller is preferably configured such that only it can access the non-volatile memory MEM. External access to the non-volatile memory is substantially impossible.

The current value, which is been encrypted and/or provided with a checksum, can be temporarily stored in the non-volatile memory MEM as a function of the operation of the application controller µC. Furthermore, charging and discharge parameters, as well as identification parameters for the energy store can also be stored in the non-volatile memory MEM. Further non-volatile memories may, however, also be provided, for example in the application unit AU, in which the parameters can be stored, preferably encrypted or provided with a checksum.

If, for example, the energy management system CTRL requests the current value, then the current value that has been encrypted and/or provided with the checksum is transmitted back to the application controller µC and, by the first or second communication interface IF1 or IF2, to the energy management system CTRL or to the external diagnosis apparatus.

In addition to transmitting identification parameters of the energy store BAT, it can also authenticate itself with the energy management system CTRL or with the other controllers, such that suitable encryption methods and/or the checksum method, for example the message authentication code method or challenge and response method can be used. The energy store BAT can therefore be identified as being suitable or not suitable. If the energy store BAT is identified as not being suitable, or manipulation has taken place between the measurement and authentication unit MAU, for example by messages being changed, this can be clearly identified and, for example, can be recorded electronically in the non-volatile memory. If damage occurs as a result of the use of non-suitable energy stores, guarantee claims can be sorted out on the basis of the record.

If in contrast, the energy store BAT is identified as a suitable energy store and the operation, as well as the charging and discharge parameters, are transmitted to the respective controller, the respective energy store can be operated efficiently by suitable adaptation of the power consumption and output. Furthermore, the entire system architecture of the motor vehicle can be operated more efficiently by the inclusion of the energy stores.

In addition to the separately used application unit AU and the security unit CU, the units can also be integrated on one chip.

In addition to the use of the application unit AU and the security unit CU in energy stores in motor vehicles, energy stores can also be equipped with units such as these, and operated, other than in motor vehicles.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An energy store for a motor vehicle comprising:
an application unit configured to at least one of record predetermined operating parameter of the energy store and process the predetermined operating parameters of the energy store;
a security unit, configured to cryptologically process the at least one of the recorded and the processed operating parameters; and
a communication interface configured to make the cryptologically processed operating parameters available, the security unit communicating only with the application unit, wherein all operating parameters are made available via the communication interface in cryptologically processed form.

2. The energy store as claimed in claim 1, wherein the security unit is configured to encrypt at least one of the recorded and the processed operating parameters.

3. The energy store as claimed in claim 1, wherein the security unit is configured to produce a checksum as a function of at least one of the recorded and the processed operating parameters.

4. The energy store as claimed in claim 1, wherein the security unit is configured to authenticate the energy store based at least in part on the cryptological processing of the operating parameters.

5. The energy store as claimed in claim 1, wherein the security unit is a smart card controller comprising a non-volatile memory for storage of data to be protected.

6. The energy store as claimed in claim 1, wherein the application unit comprises an application controller and peripheral interfaces configured for the at least one of the recording and the processing of the predetermined operating parameters of the energy store.

7. The energy store as claimed in claim 1, wherein the security unit and the application unit are integrated on one chip.

8. The energy store as claimed in claim 7, wherein the application unit comprises the communication interface.

9. The energy store as claimed in claim 8, wherein the communication interface is configured to wirelessly transmit at least one of the operating parameters and the cryptologically processed operating parameters.

10. The energy store as claimed in claim 1, wherein the application unit comprises a measurement unit configured to record operating parameters of the energy store.

11. The energy store as claimed in claim 1, wherein the energy store is configured as one of a battery and a capacitor.

12. The energy store as claimed in claim 1, wherein the communication interface is configured as at least one of a CAN, a LIN, a wireless interface, a USB interface, an RS232 interface, and a WLAN.

13. The energy store as claimed in claim 1, wherein the operating parameters are at least one of a voltage, a current, a capacity, a temperature and a type of energy store.

14. The energy store as claimed in claim 13, wherein at least one of a voltage response and a current response of the energy store is determined based at least in part on the operating parameters, and the at least one of the voltage response and the current response is used to determines at least one of a charging and discharge process.

15. An energy store for a motor vehicle comprising:
an application unit comprising an application controller and peripheral interfaces configured to at least one of record predetermined operating parameters of the energy store and process the predetermined operating parameters of the energy store;
a security unit, configured to:
cryptologically process the at least one of the recorded and the processed operating parameters;
encrypt at least one of the recorded and the processed operating parameters;
produce a checksum as a function of at least one of the recorded and the processed operating parameters; and
authenticate the energy store based at least in part on the cryptological processing of the operating parameters; and
a communication interface configured to make the cryptologically processed operating parameters available, the security unit communicating only with the application unit, wherein all operating parameters are made available via the communication interface in cryptologically processed form.

16. The energy store as claimed in claim 15, wherein the communication interface is configured to wirelessly transmit the cryptologically processed operating parameters.

17. The energy store as claimed in claim 15, wherein the application unit comprises a measurement unit configured to record operating parameters of the energy store.

18. The energy store as claimed in claim 15, wherein the security unit is a smart card controller comprising a nonvolatile memory for storage of data to be protected.

* * * * *